US011805801B2

(12) United States Patent
Eichenlaub et al.

(10) Patent No.: US 11,805,801 B2
(45) Date of Patent: Nov. 7, 2023

(54) DEVICES, SYSTEMS, AND METHODS FOR REAL-TIME PEELING

(71) Applicant: Frito-Lay North America, Inc., Plano, TX (US)

(72) Inventors: Sean Eichenlaub, McKinney, TX (US); Christopher Koci, Austin, TX (US); Keith Chan, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 254 days.

(21) Appl. No.: 17/406,555

(22) Filed: Aug. 19, 2021

(65) Prior Publication Data

US 2022/0053811 A1    Feb. 24, 2022

Related U.S. Application Data

(60) Provisional application No. 63/068,119, filed on Aug. 20, 2020.

(51) Int. Cl.
| | | |
|---|---|---|
| *A23N 7/02* | (2006.01) | |
| *A46B 13/00* | (2006.01) | |
| *A46B 13/02* | (2006.01) | |
| *G06T 7/00* | (2017.01) | |
| *A23L 19/12* | (2016.01) | |
| *G06N 20/00* | (2019.01) | |
| *A46B 15/00* | (2006.01) | |
| *G06N 3/042* | (2023.01) | |
| *A23N 7/00* | (2006.01) | |

(52) U.S. Cl.
CPC ............... *A23N 7/02* (2013.01); *A23L 19/14* (2016.08); *A46B 13/001* (2013.01); *A46B 13/02* (2013.01); *A46B 15/0006* (2013.01); *G06N 3/042* (2023.01); *G06N 20/00* (2019.01); *G06T 7/0004* (2013.01); *A23N 2007/007* (2013.01); *A23V 2002/00* (2013.01); *A46B 2200/3093* (2013.01); *G06T 2207/10048* (2013.01); *G06T 2207/20081* (2013.01); *G06T 2207/20084* (2013.01); *G06T 2207/30128* (2013.01)

(58) Field of Classification Search
None
See application file for complete search history.

(56) References Cited

U.S. PATENT DOCUMENTS

| | | |
|---|---|---|
| 4,710,389 A | 12/1987 | Dornow |
| 5,550,927 A | 8/1996 | Zittel et al. |
| 5,780,088 A | 7/1998 | Zittel et al. |
| 5,843,508 A | 12/1998 | Fuhrman |
| 5,858,429 A | 1/1999 | Wallace |
| 6,280,785 B1 | 8/2001 | Yang et al. |
| 6,530,310 B2 | 3/2003 | Schrader et al. |
| 10,349,663 B2 | 7/2019 | Contractor et al. |
| 2014/0154378 A1 | 6/2014 | Von Hasseln et al. |
| 2016/0235110 A1 | 8/2016 | Bajema et al. |

FOREIGN PATENT DOCUMENTS

| | | |
|---|---|---|
| WO | 2016177628 | 10/2016 |
| WO | 2017006330 | 12/2017 |
| WO | 2019/071361 | 4/2019 |

OTHER PUBLICATIONS

International Search Report and Written Opinion dated Nov. 26, 2021 in PCT/US2021/046654.

*Primary Examiner* — Jyoti Chawla
(74) *Attorney, Agent, or Firm* — Barnes & Thornburg LLP; Steven D. Shipe

(57) ABSTRACT

Devices, systems, and methods for real-time peeling are disclosed. Peeling can include including evaluating and controlling one or more peelers to remove peel from organic materials. Evaluation can be performed by an evaluation system including a convolutional neural network to determine a peel value. Control can be performed by a machine learning model on the basis of the peel value. Control can include determination of real-time settings for peeler tool speed and/or gate position.

29 Claims, 11 Drawing Sheets
(3 of 11 Drawing Sheet(s) Filed in Color)

DEVICES, SYSTEMS, AND METHODS FOR REAL-TIME PEELING

CROSS-REFERENCE TO RELATED APPLICATION

This patent application claims the benefit of and priority to U.S. Provisional Patent Application No. 63/068,119, filed Aug. 20, 2020, the entire disclosure of which is incorporated herein by reference.

FIELD

The present disclosure relates to devices, systems, and methods for peeling, and more particularly to devices, systems, and methods for real-time peeling.

SUMMARY

According to one aspect of the present disclosure, a system for peeling organic material having a peel may include one or more peelers each having at least one peeler tool for engaging organic material for peeling and a gate for operation to govern rate of discharge of organic material; a peel evaluation system for analyzing image information of peeled organic material to determine a peel value; and a control system configured to govern operation of the one or more peelers based on the determined peel value. The control system may include a machine learning model configured to determine, in real-time, a gate position and/or a peeler tool speed for each of the one or more peelers, based on the determined peel value.

In some embodiments, the machine learning model may be defined based on a simulation model comprising a physical simulation of organic material within the one or more peelers. The simulation model may include line data of peeled organic material. The physical simulation of organic material and the line data may applied as a reduced order model and the simulation model may include the physical simulation defined by the reduced order model.

In some embodiments, the machine learning model may include a reinforcement learning model. The simulation model may be configured to provide training datasets applied by the machine learning model to generate numerical coefficients for operation of the machine learning model to govern operation of the one or more peelers based on the determined peel value. The training datasets applied by the machine learning model may be generated in the simulation model.

In some embodiments, the machine learning model may be formed as a reinforcement model achieving reward reinforcement based on the simulation model to define the reinforcement model. Reward reinforcement may be determined based on an amount of peel and an amount of pulp loss. The peel evaluation system may include at least one camera for capturing visual images of the peeled organic material for analysis.

In some embodiments, the at least one camera may be arranged to capture visual images of peeled organic material within the one or more peelers. The at least one camera may be arranged to capture visual images of peeled organic material downstream of the gate. In some embodiments, the peel evaluation system may include a convolution neural network for analysis of image information, and the output of the convolutional neural network yields determination of the peel value as a numerical output value.

In some embodiments, the at least one camera may be adapted to capture image information in the visible spectrum. The at least one camera may be adapted to capture image information outside the visible spectrum. The at least one camera may be adapted to capture image information in the near infrared spectrum.

According to another aspect of the present disclosure, a method of operating a peeling system including one or more peelers for peeling organic material may include generating a simulation model based on a physical simulation of organic material within a peeler; defining a machine learning model based on the simulation model for governing control of the one or more peelers; evaluating image information of peeled organic material to determine a peel value; operating the defined machine learning model to determine, in real-time, desired gate position and desired peeler tool speed based on the determined peel value; and controlling a gate and/or a peeler tool of the one or more peelers to have the desired gate position and/or desired peeler tool speed, respectively.

In some embodiments, evaluating image information of organic material, operating the define machine learning model to determine gate position and peeler tool speed in real-time, and controlling the gate and peeler tool may occur recursively. Generating the simulation model based on a physical simulation of organic material may include defining the simulation model from a reduced order model based on the physical simulation and line data from organic material from the one or more peelers. Defining the machine learning model may include training the machine learning model based on training datasets.

In some embodiments, the machine learning model may be a reinforcement model achieving reward reinforcement based on the simulation model. Reward reinforcement may be determined based on an amount of peel and an amount of pulp loss. In some embodiments, the method may further include defining the training datasets by the simulation model.

According to another aspect of the present disclosure, a method of operating a peeling system including one or more peelers for peeling organic material may include evaluating image information of peeled organic material to determine a peel value; operating the machine learning model to determine, in real-time, at least one of desired gate position and desired peeler tool speed based on the determined peel value; and controlling at least one of a gate and a peeler tool of the one or more peelers based on the determined peel value.

In some embodiments, the method may further include defining the machine learning model based on the simulation model for governing control of the one or more peelers. In some embodiments, the method may further include generating a simulation model based on a physical simulation of organic material within a peeler, wherein the simulation model defines the machine learning model.

According to another aspect of the present disclosure, a peel evaluation system for determining peel value based on image information of peeled organic material may include one or more image capture devices for acquiring images of peeled organic material; and an evaluation control system for analyzing image information of the acquired images and determining a peel value. In some embodiments, the evaluation control system may include a convolutional neural network. The convolutional neural network may be defined based on training data sets including baseline information comprising classified image information of multispectral images of peeled organic material.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
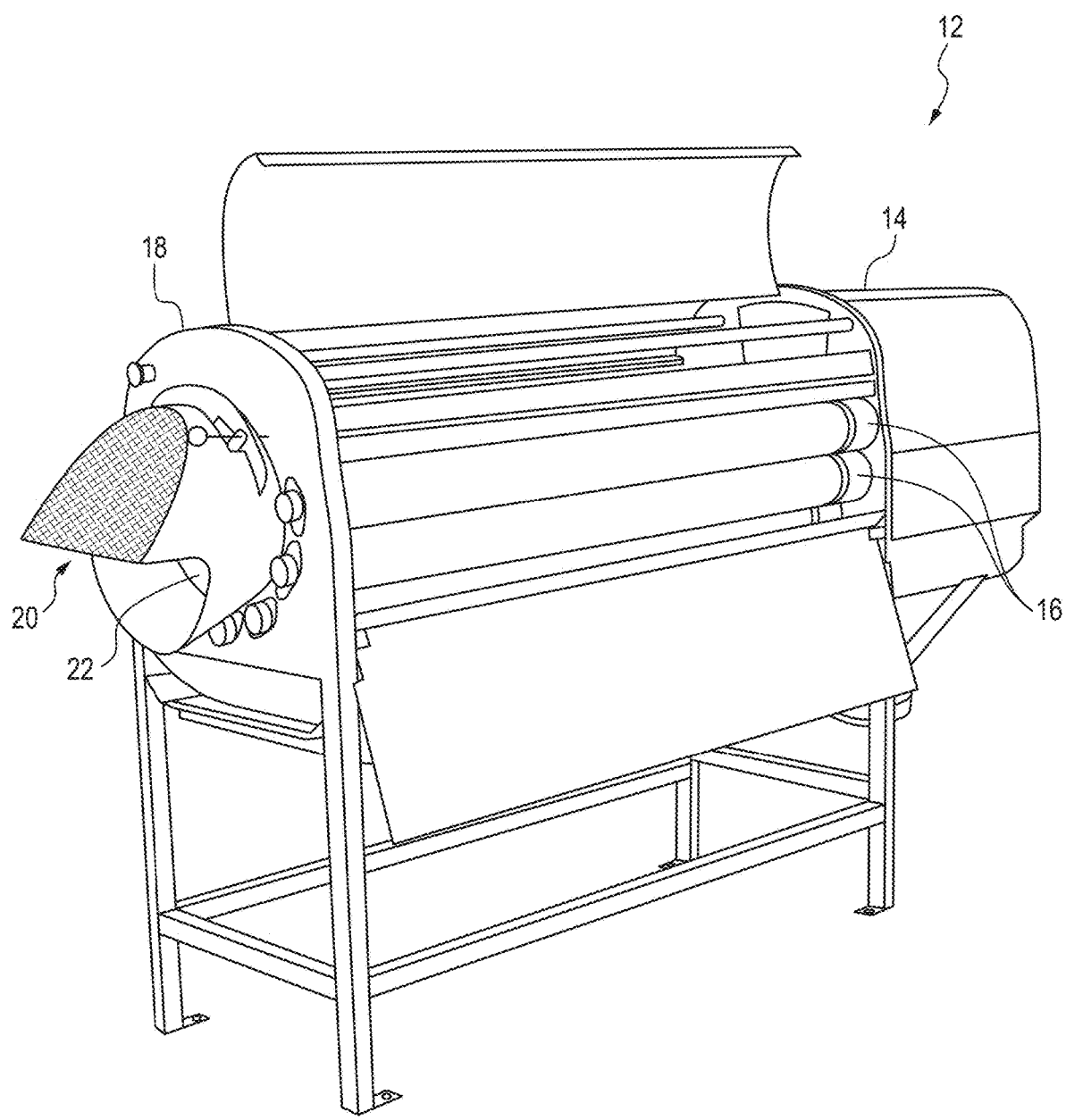
Figure 2:
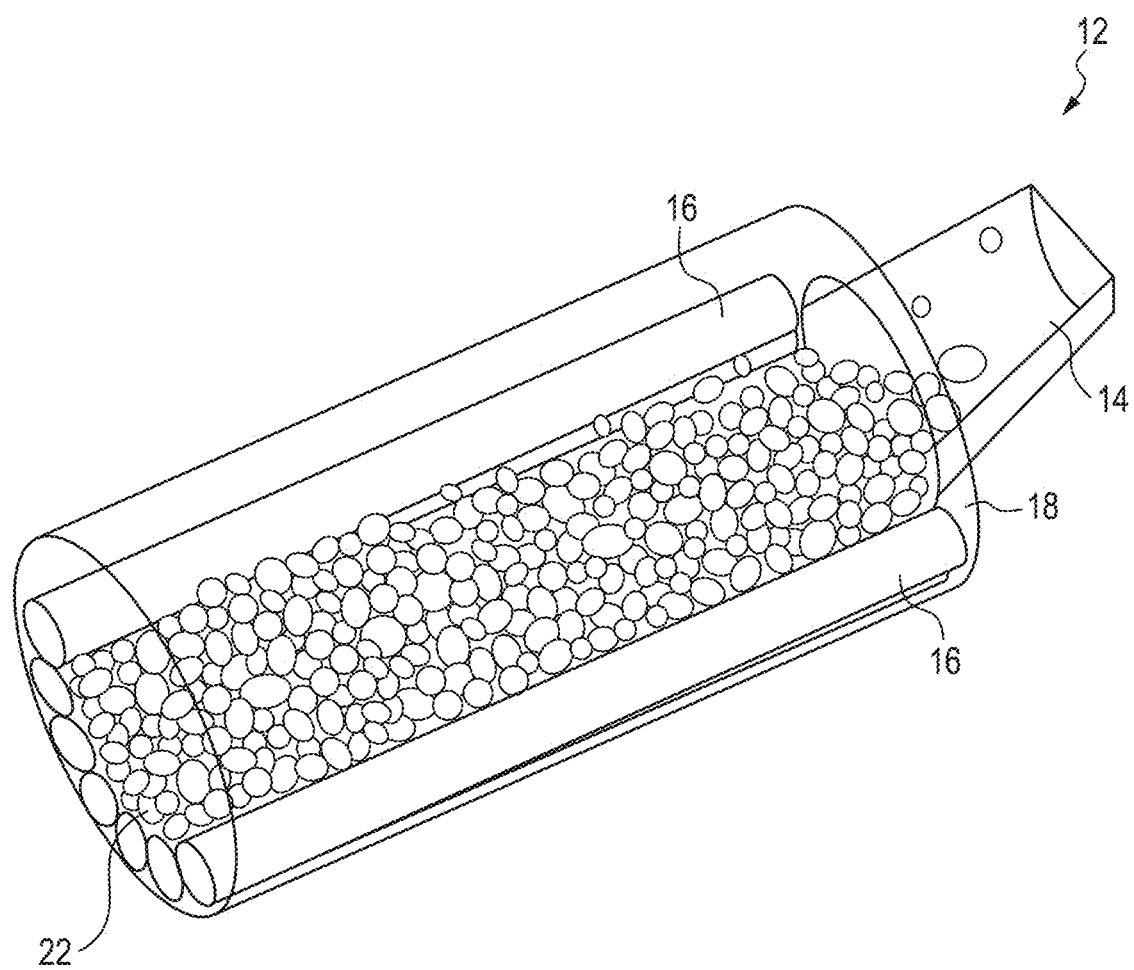
Figure 3:
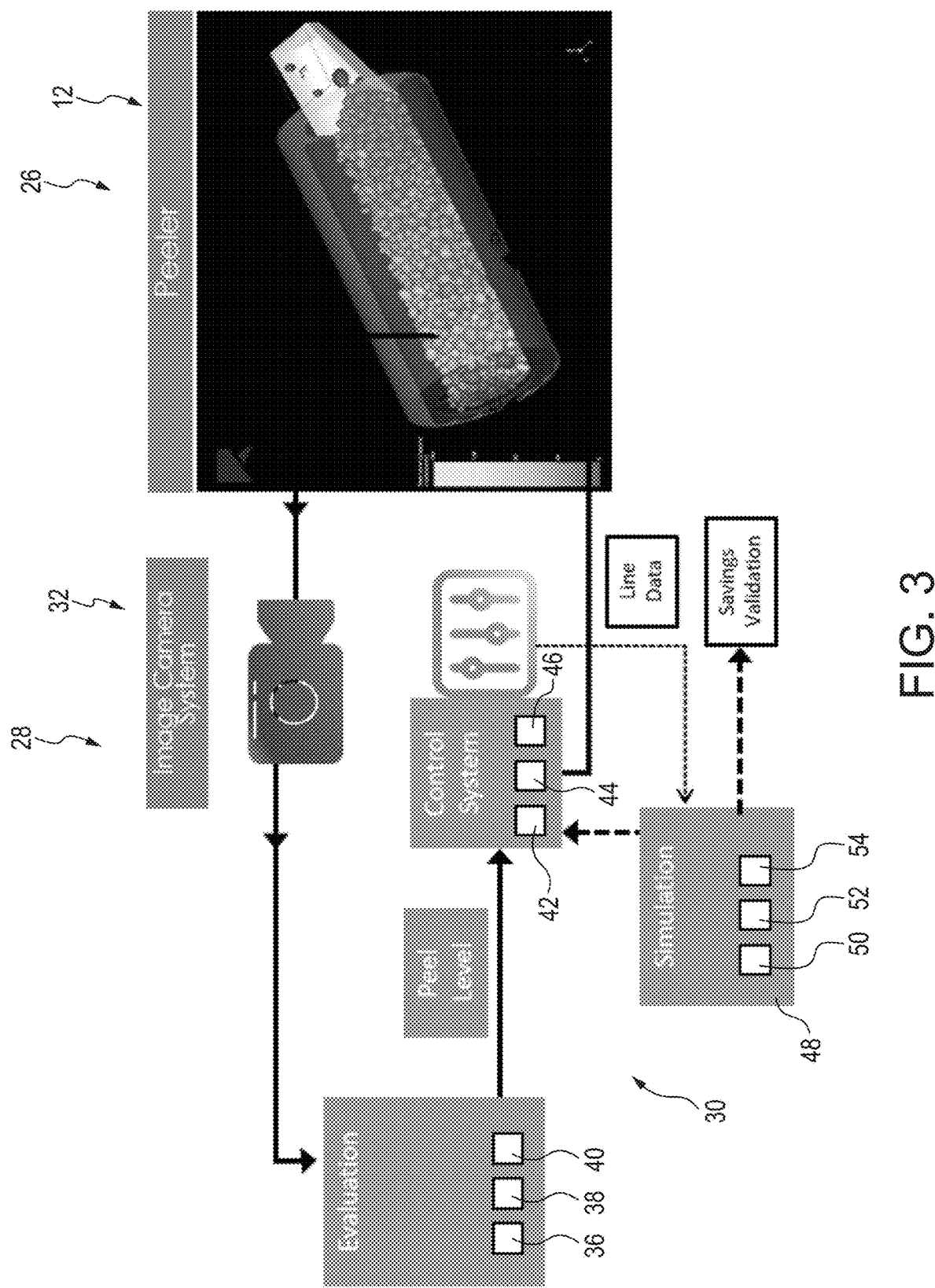
Figure 4:
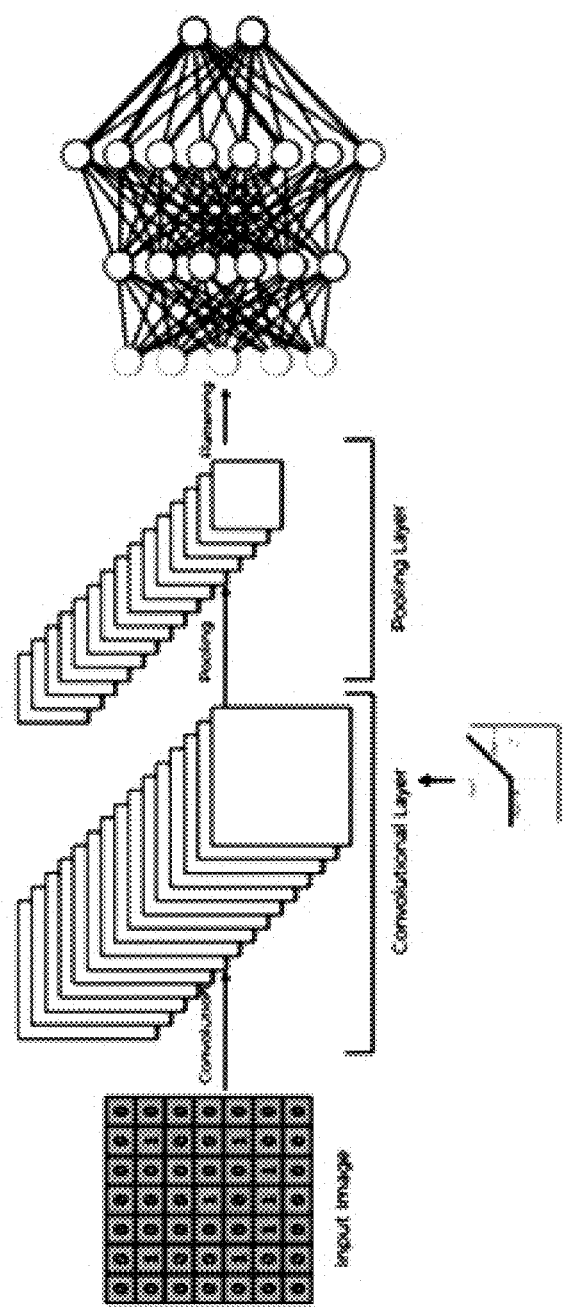
Figure 5A:
Figure 5B:
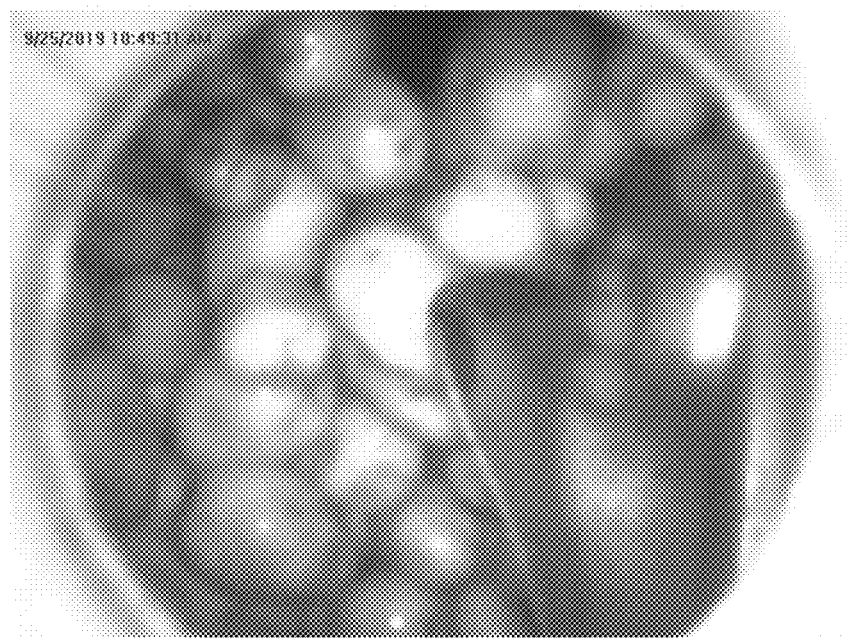
Figure 5C:
Figure 5D:
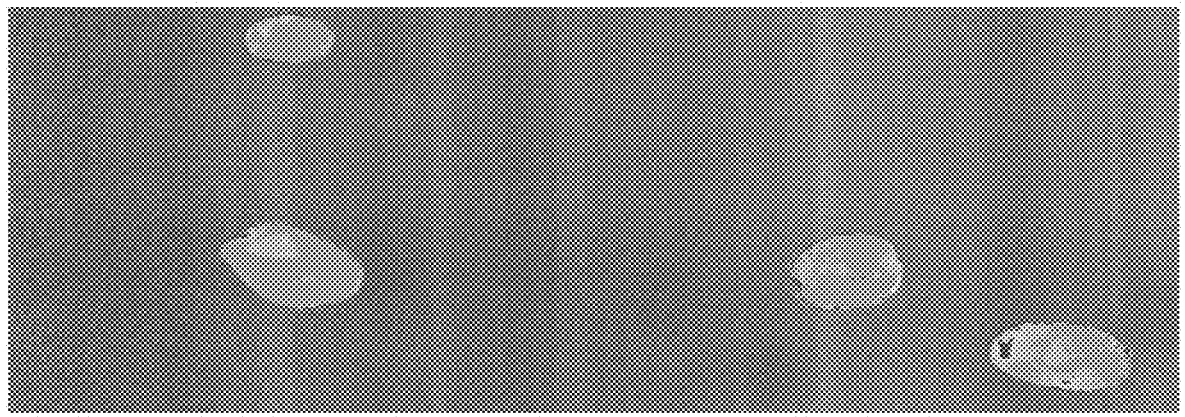
Figure 6:
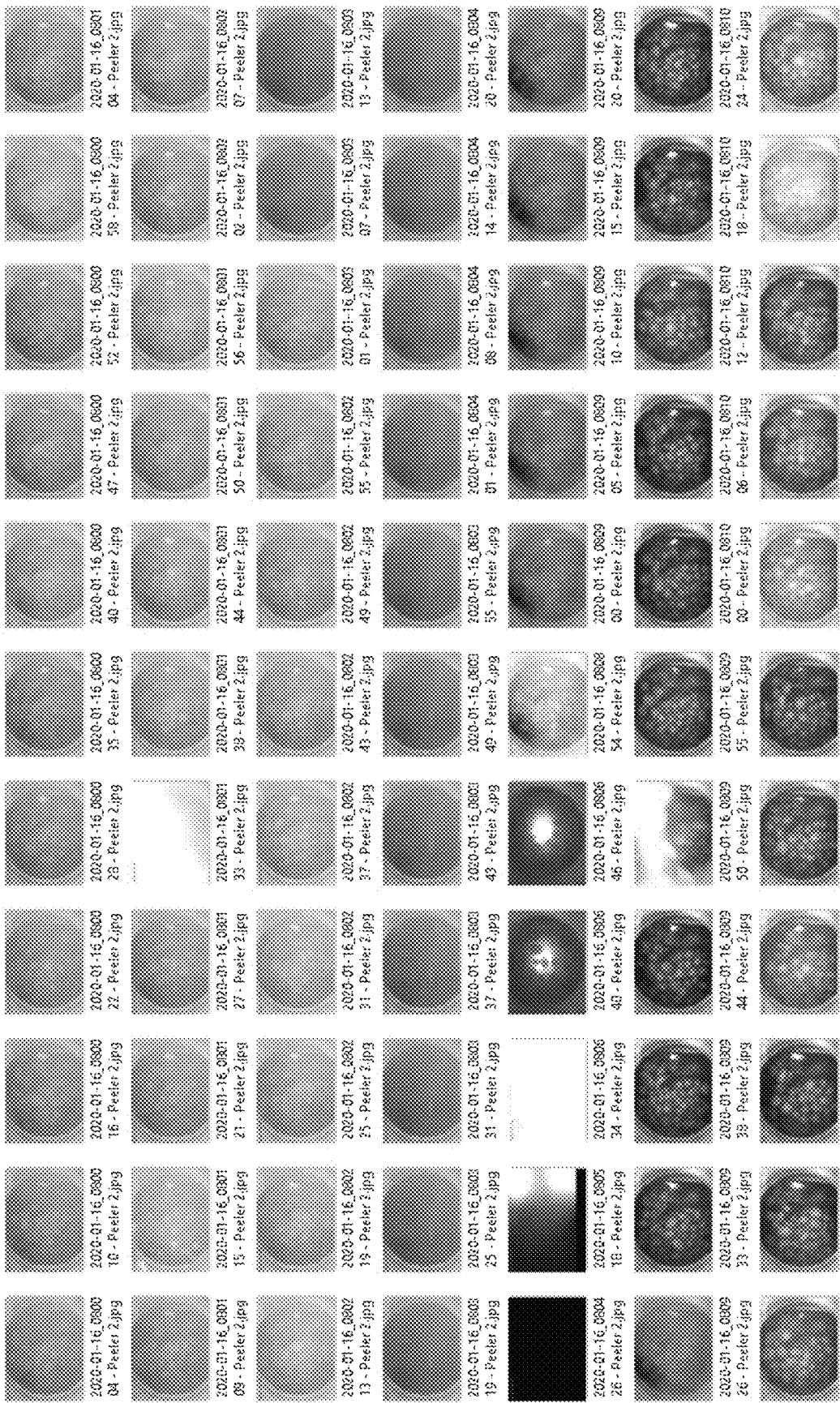
Figure 7:
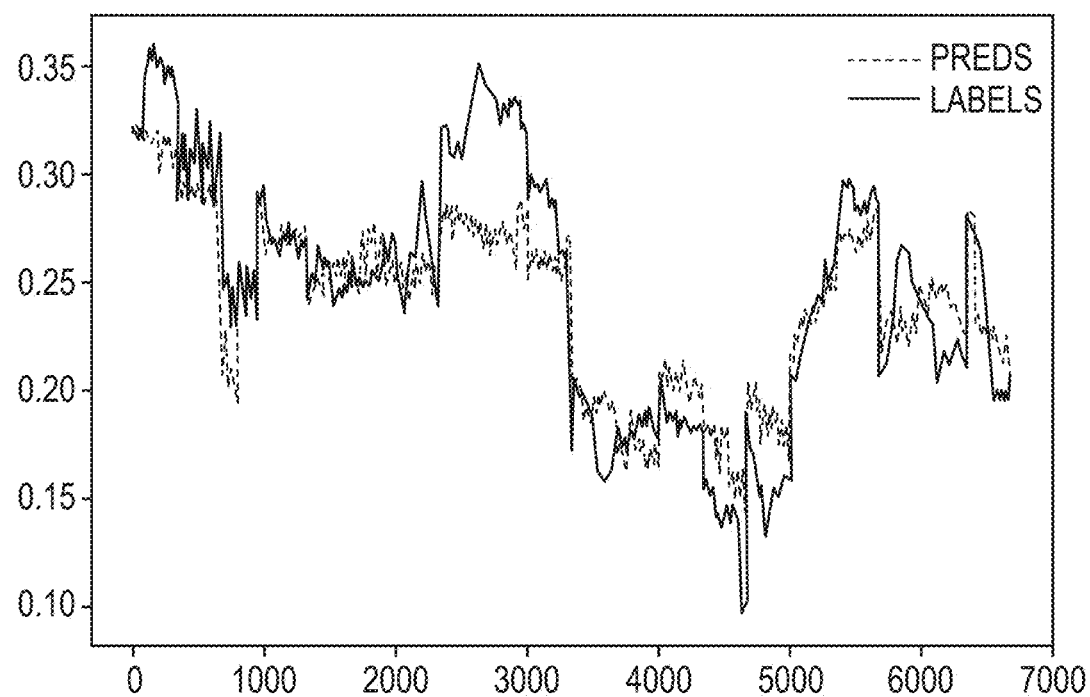
Figure 8:
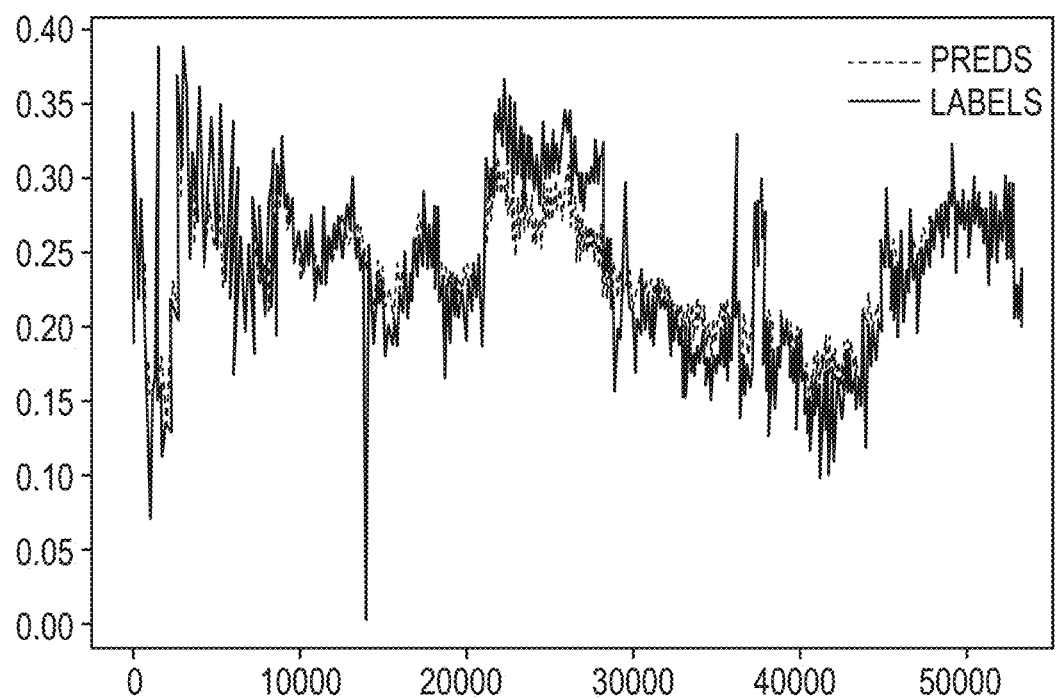
Figure 9:
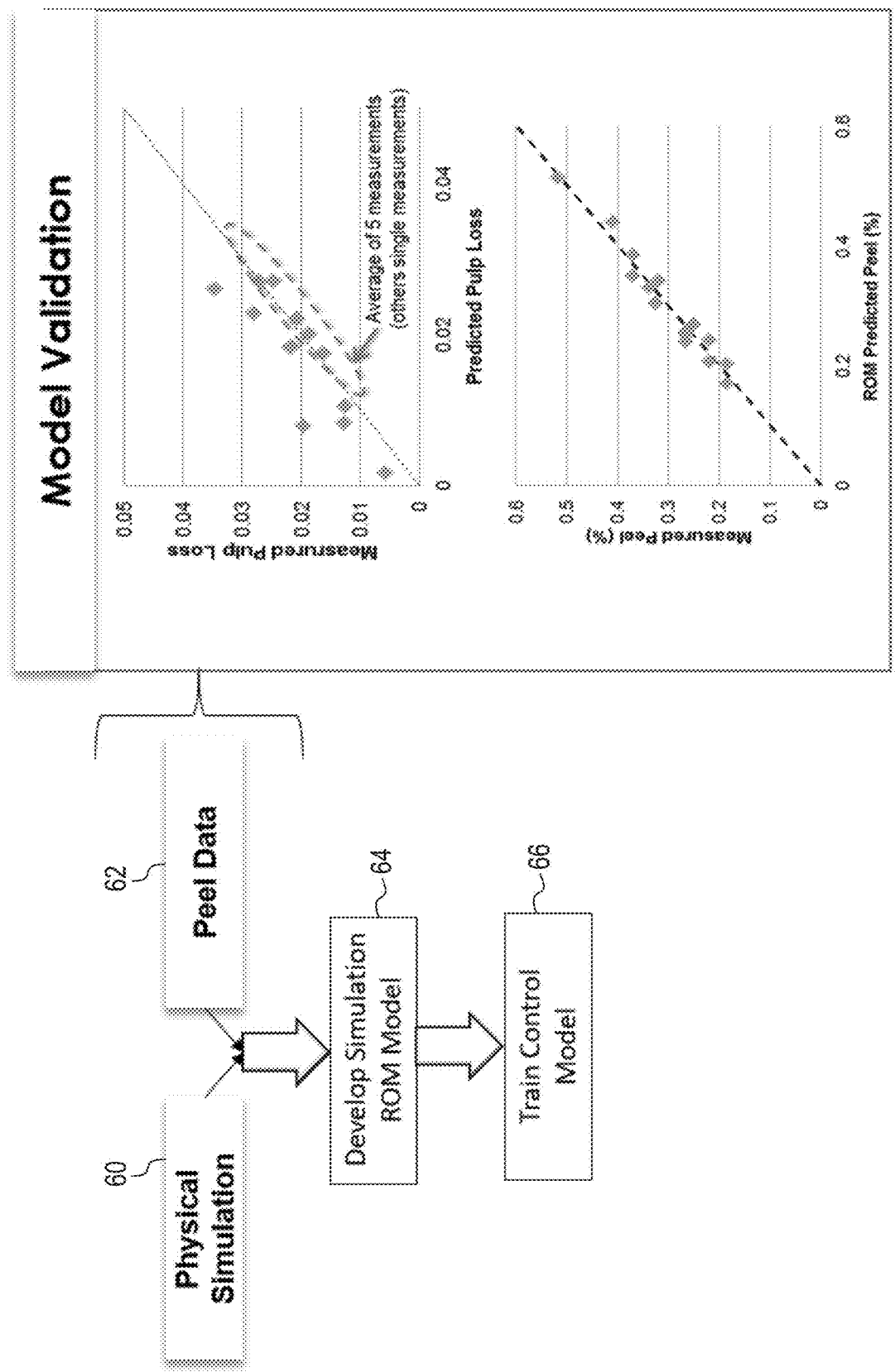
Figure 10:
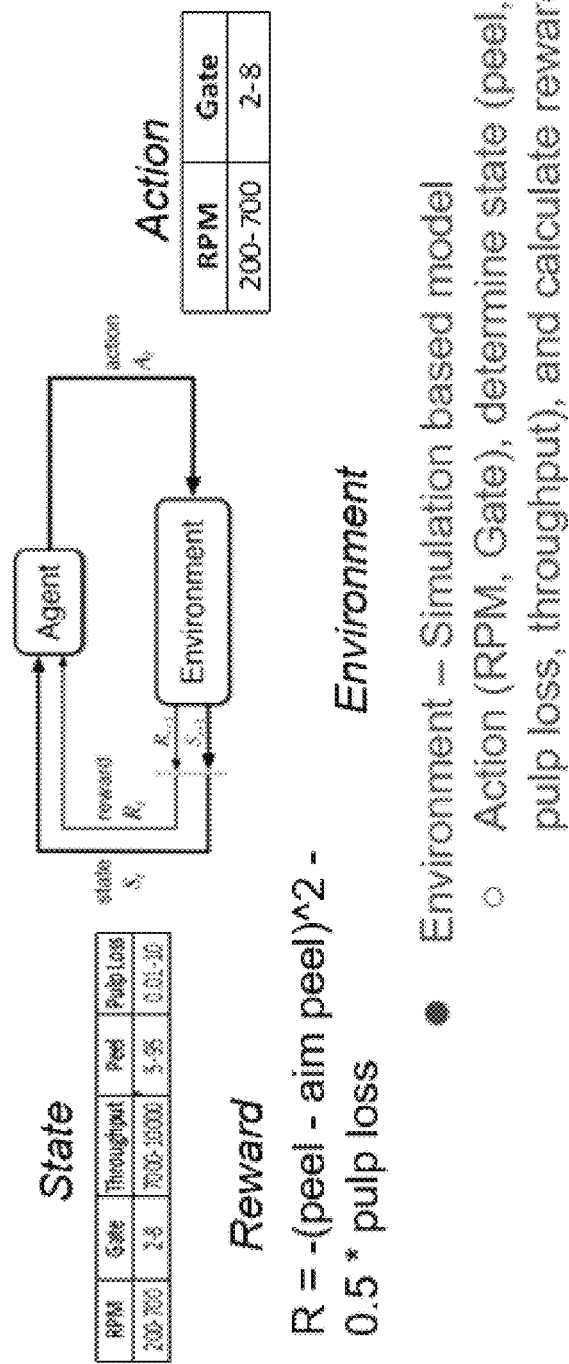
Figure 11:
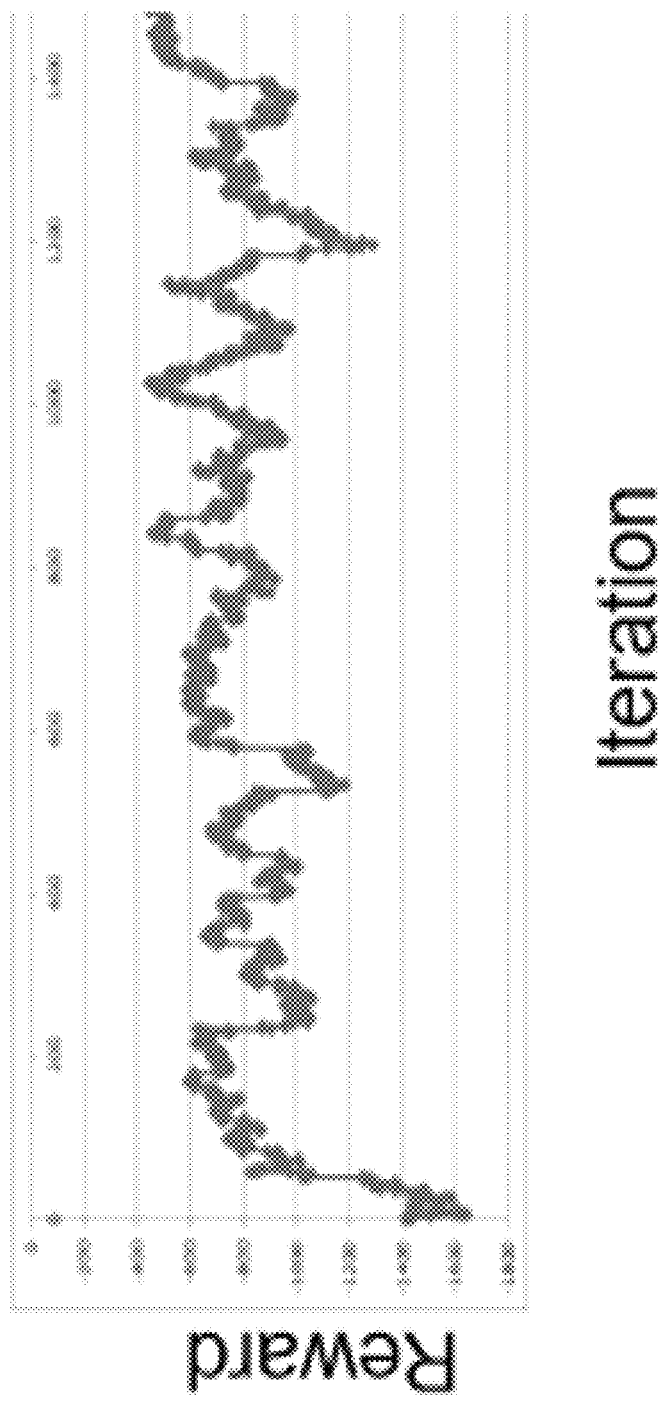

The detailed description particularly refers to the accompanying figures in which:

FIG. 1 is perspective view of a peeler for organic material such as fruits and vegetables;

FIG. 2 is a diagrammatic perspective view of portions of the peeler of FIG. 1 rendered transparent to illustrate organic material flow;

FIG. 3 is a diagrammatic view of a peeler system including the peeler of FIG. 1, an evaluation system, and a control system;

FIG. 4 is a diagrammatic view of a convolutional neural network (CNN) of the evaluation system of FIG. 3;

FIG. 5A is an exemplary image captured by the evaluation system of the peeler system of FIG. 3 in the visible spectrum showing organic material (potatoes) from the peeler in red-green-blue depiction;

FIG. 5B is another exemplary image captured by the evaluation system of the peeler system of FIG. 3 in the visible spectrum showing organic material (potatoes) from the peeler in red-green-blue depiction;

FIG. 5C is an exemplary image for training the evaluation system of the peeler system of FIG. 3 in the visible spectrum showing organic material (potatoes) from the peeler in red-green-blue depiction;

FIG. 5D is an exemplary image for training the evaluation system of the peeler system of FIG. 3 the image including pixel classification for peeled organic material from the peeler;

FIG. 6 is a number of images captured by the evaluation system of the peeler system of FIG. 3 illustrating some acceptable images and some images containing unreasonable defects;

FIG. 7 is a graphical depiction of the performance of the CNN with image data cleaned by exclusion of images having unreasonable defects;

FIG. 8 is a graphical depiction of the performance of the CNN without image data cleaned, for example, without exclusion of images having unreasonable defects;

FIG. 9 is a flow diagram and validation graph illustrating a development of training data sets for defining a machine learning model of the control system of the peeler system of FIG. 3;

FIG. 10 is a diagrammatic depiction of the operations defining the machine learning model of the control system of the peeler system of FIG. 3; and FIG. 11 is a graphical depiction of the performance of the machine learning model of the control system of the peeler system of FIG. 3.

DETAILED DESCRIPTION

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring to FIG. 1, a peeler 12 is shown for peeling organic material such as fruits and/or vegetables. Although the organic material may be grown "organically" (i.e., without use of certain additive chemicals such as artificial fertilizers and/or pesticides), organic material includes a wide variety of consumable food products including fruits, vegetables, nuts, legumes, roots, and/or similar materials whether strictly classified as a fruit or vegetable or otherwise, and whether grown in accordance with specialty "organic" food labelling requirements or not. The peeler 12 is arranged for removing some or all of the peel of the organic material, for example, potatoes having a peel. For sake of descriptive ease, exemplary organic material within the present disclosure may refer to potatoes, although such reference to potatoes is not limiting. The organic material can be loaded into the peeler 12 to remove some or all of its peel. The peeler 12 illustratively receives organic material via hopper 14 for feeding into engagement with peeler tools 16 to remove some or all of the peel.

In the illustrative embodiment as shown in FIG. 1, the peeler 12 is an abrasive peeler having a peeler chamber 18 in communication with the hopper 14 to receive organic material for peeling. A number of peeler tools 16 are arranged within the peeler chamber 18 to engage the organic material to remove portions of peel. The peeler tools 16 are illustratively embodied as abrasive brushes formed as rollers.

The peeler tools 16, as abrasive brush rollers, are driven (by a motor, not shown) for rotation about their longitudinal axis to abrade the surface of the organic material to remove its peel. The peeler tools 16 extend longitudinally within the peeler chamber 18 between the hopper 14 and a discharge 20 of the peeler 12 to engage the organic material as it passes from the hopper 14, through the peeler chamber 18, and out through the discharge 20. A depiction of the interior of the peeler chamber 18 can be seen in FIG. 2 to illustrate potatoes flowing through the peeler 12 for peeling. One non-limiting example of a suitable abrasive peeler is marketed as model 2024 by Vanmark, of Creston, Iowa. In some embodiments, the peeler 12 may include any suitable variety of peeler tools, including but not limited to abrasive, bladed, and/or pressure washing tools.

In the illustrative embodiment of the peeler 12, the flow of organic material from the hopper 14, through the peeler chamber 18, and to the discharge 20 is fed by gravity, such that the hopper 14 is elevated relative to the discharge 20, and the peeler tools 16 provide an inclined platform sloping towards the discharge 20 to encourage movement of the organic material towards the discharge 20 by gravity in conjunction with the rotation of the peeler tools 16 embodied as rotational abrasive brushes. In some embodiments, any other suitable manner of feeding of organic material through the peeler 12 may be applied, including but not limited to mechanized features such as augers and/or feed belts.

As shown in FIG. 1, a gate 22 is arranged at the discharge 20 of the peeler 12 for governing the flow of (peeled) organic material out through the discharge 20. The gate 22 is operable for variable positioning between a closed position and an open position to govern the desirable flowrate of (peeled) organic material passing through the discharge 20 from the peeler chamber 18. The gate 22 is embodied as a door such that variable positioning of the gate 22 determines the size of the opening communicating the peeler chamber 18 with the discharge 20, and thereby governing the flowrate of organic material through the peeler 12.

In traditional peelers, operational control can be performed manually. For example, the speed of rotation of peeler tools 16 as rotating brushes and/or the position of the gate 22 may be adjusted by direct setting, according to the desired level of peeling. However, peeling can be a fluid process. For example, in the case of potato peeling, the extent of peeling can be influenced by the shape, size, firmness, variety, moisture/wetness, other features of each specific potato, and/or by the dwell time within the peeler chamber 18 and number of potatoes in the peeler chamber 18 at a given time. Even with careful attention to the rotational speed of the peeler tools 16 and/or the position of gate 22, it can be challenging to remove a desirable amount of peel without excessive loss of pulp of the organic material, which in the context of potatoes includes loss of the desirable inner flesh of the potato, rather than merely the outer peel or skin. However, automation techniques, such as photograph analysis of the organic material, have faced challenges in real-time control of peeler operations.

Referring to the illustrative embodiment of FIG. 3, a peeler system 26 for peeling organic material having a peel is shown diagrammatically. The peeler system 26 includes the peeler 12, an evaluation system 28, and a control system 30. The evaluation system 28 can analyze image information of peeled organic material to determine the extent of peeling achieved. The control system 30 can responsively adjust the control parameters based on the extent of peeling to provide real-time control governance. As discussed herein, by incorporating artificial intelligence techniques into the peeler system 26, preferred peeling can be achieved on a real-time basis.

The evaluation system 28 includes a camera 32 for capturing images of organic material. In the illustrative embodiment, the camera 32 is arranged to capture images of organic material within the peeler 12, near the discharge 20, which may include peeled organic material that would be discharged through the gate 22 in its current state of peel and/or organic material that would still receive some additional peeling before being discharged through the gate 22. However, in some embodiments, camera 32 may be arranged to capture images of the organic material downstream of the discharge 20 (after exiting the peeler chamber 18). The camera 32 is shown as a single camera adapted to capture images within the visual spectrum. In some embodiments, the camera 32 may be adapted to capture images in the near infrared (NIR) spectrum, and/or may include any suitable number and/or manner of image capture devices within a camera system for capturing image information of peeled organic material, for example, multiple cameras for capturing images of organic material from one or more peelers 12 at one or more positions in the flow of organic material. The evaluation system 28 includes an evaluation control system 34 for governing evaluation system operations.

The evaluation control system 34 includes a processor 36, memory 38, and communication circuitry 40 for conducting evaluation system operations. The processor 36 executes instructions stored on memory 38, and can communicate signals via other devices, such as the camera 32, via the communication circuitry 40. The evaluation control system 34 receives image data from the camera 32 and determines a peel level based on the image data. In the illustrative embodiment, the peel level includes a peel value indicating the level (or amount) of peel removal of the peeled organic material through the discharge 20. The peel value can include indication of one or both percentage of peel removed (and by implication amount of peel remaining) and/or amount of pulp loss.

The evaluation system 28 illustratively comprises a neural network, embodied as a convolutional neural network (CNN). The CNN is illustratively stored on memory 38 for execution by the processor 36. Referring briefly to FIG. 4, the CNN illustratively comprises a number of layers, including at least one convolutional layer, for analyzing image data passed through each layer successively to generate an output. The CNN is illustratively trained by analysis of baseline images of organic material together with predetermined (baseline) peel value information to develop a ground truth (system of layers) for evaluation of peel value as a numerical output.

As shown in FIGS. 5A and 5B, exemplary training images of peeled organic material have been captured by the evaluation system 28 for determining peel value, each showing image information in the visual spectrum (e.g., Red-Green-Blue "RGB" data). As shown in FIG. 5C, an exemplary multispectral image of peeled organic material includes multi-spectral image information, for example, in the visual (e.g., RGB) and near-infrared (NIR) spectrums. Multispectral images are captured to correspond with the exemplary training images in FIGS. 5A and 5B. For example, by capturing multispectral images at the same time, or near the same time, as the training images to ensure that the subject organic material of multispectral images corresponds with the subject organic material of the training images by capturing image information regarding the same organic material in each of the training images and the multispectral images, or at a minimum, by capturing multispectral images of subject organic material that is representative of the subject organic material of the training images in terms of peel level.

In the illustrative embodiment, the multispectral images are captured by a training system, apart from the evaluation system 28, comprising suitable cameras, processors, memory, and communication circuitry, and the image capture process of each of the evaluation system 28 and the training system is coordinated to correspond with the same (or representative) organic material from the peeler 12. However, in some embodiments, the training system may be formed as a part of the evaluation system 28, and/or apply partly or wholly shared features such as cameras, processors, memory, and/or communication circuitry. The training system illustratively analyzes the multispectral information of the multispectral images to provide classification images from the multispectral information, as shown by example in FIG. 5D.

The classified images (e.g., as shown in FIG. 5D), represent each color in the image with pixel classification, illustratively shown as orange for flesh, pink for peel, and blue for black defect. The classification information of the classification images illustratively comprises a count of peel pixels divided that by a count of organic material (potato) pixels to establish a baseline truth for peel removal amount at a given moment of time (e.g., using a 30-second moving average, as individual images may only contain only a few items (potatoes)). The classification information is provided to the CNN as the predetermined (baseline) peel value information together with the training images, such as in FIGS. 5A and 5B, to train the CNN. Accordingly, the CNN receives training images together with baseline peel value information as training data sets to develop the ground truth (system of layers) for evaluation of peel value as a numerical output. Although training the CNN may require consideration of many thousands of training images with baseline peel values, the training data sets as disclosed herein can reduce the volume of training data required to provide real-time evaluation of peel level.

As shown in FIG. 6, a variety of captured images are shown many of which may include unreasonable defects such as including a dirty/cloudy window, no potatoes in the peeler, or acquisition artifacts such as black lines in the image. Images having unreasonable defects may be preferably excluded from CNN application data including either or both of training data and/or evaluation data in operation. Such classification of clean data to remove defects may be achieved prior to input into the CNN and/or as a layer in the CNN itself.

FIGS. 7 and 8 illustrate the difference in the ability of the CNN to evaluate peel value when applying uncleaned data (FIG. 7) and when applying cleaned data (FIG. 8). In FIGS. 7 and 8, The dashed lines in FIGS. 7 and 8 represent CNN predictions of peel level using an exemplary set of validation images of known peel level as ground truth validations values. The solid lines in FIGS. 7 and 8 represent the ground truth validation values for peel level, the x-axis represents individual images of organic material considered over time, while the y-axis is the amount of peel remaining on the organic material, here the potato, where a value of zero (0) indicates no peel remaining, and a value of one (1) indicates completely unpeeled organic material. Closer adherence of the CNN prediction of output peel level to the ground truth validation values in FIG. 8 as compared to FIG. 7, illustrates the increase in CNN evaluation accuracy and/or precision by applying cleaned data.

In the illustrative embodiment, the CNN is formed as a regression model suitable for continuous analysis of organic material from the peeler 12. Configuration of the CNN to provide numerical output in lieu of traditional CNN classification of image data can assist in enabling continuous analysis. Continuous analysis by the CNN can reduce and/or avoid the need for massive amounts of training data to be analyzed in order to capture the extent of variations of organic material which can be experienced. In some embodiments, the evaluation system may include any suitable manner of artificial intelligence model to provide the peel level. As discussed in additional detail herein, the peel level can be communicated to the control system 30 for use in control system operations.

The control system 30 provides governing control of the operations for the peeler 12. In the illustrative embodiment, the control system 30 determines the desired speed of the rotation of the peeler tools 16 and the position of the gate 22, in real-time, at settings based on the peel level communicated from the evaluation system 28. In some embodiments, the control system 30 may govern additional operations, for example, feed rate into the hopper 14.

Returning to FIG. 3, the control system 30 includes a processor 42, memory 44, and communication circuitry 46 for conducting control system operations. The processor 42 executes instructions stored on memory 44, and can communicate signals with other devices and/or systems, such as the peeler 12 and/or evaluation system 28, via the communication circuitry 46. The control system 30 includes a machine learning model for determining real-time settings for the peeler 12.

The machine learning model of the control system 30 is illustratively embodied as a reinforcement learning model for determining real-time settings. The reinforcement learning model is illustratively stored on memory 44 for execution by processor 42 to conduct operations of the control system 30. The reinforcement learning model is illustratively defined according to training with a simulation model 48 of the control system 30.

The simulation model 48 illustratively comprises a physical simulation of organic material flowing through the peeler 12. Referring to FIG. 9, the physical simulation in box 60 is illustratively applied in the simulation model 48 together with line data (peel data) in box 62 from actual peeled organic material from the peeler 12 as a reduced order model (ROM) in box 64 for defining the reinforcement model of the control system 30. In the example of potato peeling, the physical model is illustratively embodied as a discrete element model (DEM) of physical movement of the potato through the peeler 12, and more specifically tumbling in engagement with the peeler tools 16 and gate 22.

The DEM is illustratively combined or supplemented with line data to produce the reduced order model. For example, the line data may include peel level (which may be indicated as discussed above by the evaluation system and/or by light box measurement of pixel intensity) and/or weight differential of potatoes before and after peeling. The line data may be selected in advance to correspond with removal of 80% of the peel (or any other suitable pre-selected amount), and may be provided from the memory 44. The reduced order model of the simulation model 48 provides a physical simulation combining physical modelling with real world line data to assemble realistic datasets for training the machine learning model of the control system 30 in box 66. The training datasets can be applied to define the machine learning model according to numerical coefficients for operation, so that the machine learning model can govern operation of the peeler 12 based on the peel level provided by the evaluation system 28.

Returning to FIG. 3, the simulation model 48 is illustratively embodied as a system including a processor 50, memory 52, and communication circuitry 54 for conducting control system operations. The processor 50 executes instructions stored on memory 52, and can communicate signals via other devices, such as the processor 42, via the communication circuitry 54. In some embodiments, the processors, memory, and/or communications circuitry of the simulation model 48 may be partly or wholly shared with the processor 42, memory 44, and communication circuitry 46.

In the illustrative embodiment, the simulation model 48 can undertake validation of its training datasets in comparison to baseline measurements for each of pulp loss and peel reduction percentage, as suggested in FIG. 9. The validation can include comparison of predictions by the reduced order model for peeling (infraction of peel remaining on the potato) and pulp loss (in percent) with ground truth validation values. In the examplary graphs in FIG. 9 for pulp loss (top-right) and peel removal percentage (bottom-right), two peelers were operated at various operating conditions to change the actual peel level and pulp loss of the organic material, the actual peel level and pulp loss of the organic material were measured as ground truth validation values. The operating conditions were inputed to the reduced order model, and the reduced order model predicted the peel precentage and pulp loss for those operating conditions. Close correlation of the reduced order model predictions with the measured ground truth validation values illustrates the accuracy and/or precision for prediction by the reduced order model. In the present example, operating conditions of the peeler 12 and inputted into the reduced order model including various rotational speeds of the peeler tools 16 within a range of about 90 rpm to about 400 rpm, and varying the position of the gate 22 from about 10% closed to about 70% closed; although any suitable operating conditions may be applied.

As mentioned in other instances, the machine leaning model of the control system 30 is embodied as a reinforcement learning (RL) model. As shown in FIG. 10, the RL model can act as the agent providing action outputs to the peeler 12, for example, real-time gate position and/or peeler tool speed. The peeler 12, and more precisely the peeled organic material from the peeler 12, can provide the environment for evaluation by the evaluation system 28. The RL model receives the state of the environment as the peel value from the evaluation system 28 and generates the appropriate reward reinforcement based on the peel value. FIG. 11 illustrates an exemplary plot of reward reinforcement of the RL model as a function of iterations in the RL model, showing an upward trend which indicates correlation to improve the amount of peel removed while reducing pulp loss. This can be achieved by removing more of the peel across the entire periphery of the potato while reducing pulp removal below the peel as the RL model learns from reinforcement.

In the illustrative embodiment, the RL model of the control system 30 is defined by learning based on the training data sets from the simulation model 48. The definition of the RL model may be updated based on either or both of the peel value provided by the evaluation system 28 and the simulation model 48. In some embodiments, definition of the RL model may be performed by combined application of the evaluation system 28 and the simulation model 48.

Within the present disclosure, various hardware indicated may take various forms. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry includes components for facilitating processor operations, for example, suitable components may include transmitters, receivers, modulators, demodulator, filters, modems, analog to digital converters, operational amplifiers, and/or integrated circuits.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

We claim:

1. A system for peeling organic material having a peel, the system comprising:
   one or more peelers each having at least one peeler tool for engaging organic material for peeling and a gate for operation to govern rate of discharge of organic material;
   a peel evaluation system for analyzing image information of peeled organic material to determine a peel value; and
   a control system configured to govern operation of the one or more peelers based on the determined peel value, wherein the control system comprises a machine learning model configured to determine, in real-time, a gate position and a peeler tool speed for each of the one or more peelers, based on the determined peel value.

2. The system of claim 1, wherein the machine learning model is defined based on a simulation model comprising a physical simulation of organic material within the one or more peelers.

3. The system of claim 2, wherein the simulation model comprises line data of peeled organic material.

4. The system of claim 3, wherein the physical simulation of organic material and the line data are applied as a reduced order model and the simulation model comprises the physical simulation defined by the reduced order model.

5. The system of claim 2, wherein the machine learning model comprises a reinforcement learning model.

6. The system of claim 5, wherein the simulation model is configured to provide training datasets applied by the machine learning model to generate numerical coefficients for operation of the machine learning model to govern operation of the one or more peelers based on the determined peel value.

7. The system of claim 6, wherein the training datasets applied by the machine learning model are generated in the simulation model.

8. The system of claim 7, wherein the machine learning model is formed as a reinforcement model achieving reward reinforcement based on the simulation model to define the reinforcement model.

9. The system of claim 8, wherein reward reinforcement is determined based on an amount of peel and an amount of pulp loss.

10. The system of claim 1, wherein the peel evaluation system comprises at least one camera for capturing visual images of the peeled organic material for analysis.

11. The system of claim 10, wherein the at least one camera is arranged to capture visual images of peeled organic material within the one or more peelers.

12. The system of claim 10, wherein the at least one camera is arranged to capture visual images of peeled organic material downstream of the gate.

13. The system of claim 10, wherein the peel evaluation system comprises a convolution neural network for analysis of image information, and the output of the convolutional neural network yields determination of the peel value as a numerical output value.

14. The system of claim 10, wherein the at least one camera is adapted to capture image information in the visible spectrum.

15. The system of claim 10, wherein the at least one camera is adapted to capture image information outside the visible spectrum.

16. The system of claim 15, wherein the at least one camera is adapted to capture image information in the near infrared spectrum.

17. A method of operating a peeling system including one or more peelers for peeling organic material, the method comprising:
    generating a simulation model based on a physical simulation of organic material within a peeler;
    defining a machine learning model based on the simulation model for governing control of the one or more peelers;
    evaluating image information of peeled organic material to determine a peel value;
    operating the defined machine learning model to determine, in real-time, desired gate position and desired peeler tool speed based on the determined peel value; and
    controlling a gate and a peeler tool of the one or more peelers to have the desired gate position and desired peeler tool speed, respectively.

18. The method of claim 17, wherein evaluating image information of organic material, operating the define machine learning model to determine gate position and peeler tool speed in real-time, and controlling the gate and peeler tool occurs recursively.

19. The method of claim 17, wherein generating the simulation model based on a physical simulation of organic material includes defining the simulation model from a reduced order model based on the physical simulation and line data from organic material from the one or more peelers.

20. The method of claim 17, wherein defining the machine learning model includes training the machine learning model based on training datasets.

21. The method of claim 20, wherein the machine learning model is a reinforcement model achieving reward reinforcement based on the simulation model.

22. The method of claim 21, wherein reward reinforcement is determined based on an amount of peel and an amount of pulp loss.

23. The method of claim 20, further comprising defining the training datasets by the simulation model.

24. A method of operating a peeling system including one or more peelers for peeling organic material, the method comprising:
    evaluating image information of peeled organic material to determine a peel value;
    operating the machine learning model to determine, in real-time, at least one of desired gate position and desired peeler tool speed based on the determined peel value; and
    controlling at least one of a gate and a peeler tool of the one or more peelers based on the determined peel value.

25. The method of claim 24, further comprising defining the machine learning model based on the simulation model for governing control of the one or more peelers.

26. The method of claim 24, further comprising generating a simulation model based on a physical simulation of organic material within a peeler, wherein the simulation model defines the machine learning model.

27. A peel evaluation system for determining peel value based on image information of peeled organic material, the system comprising:
    one or more image capture devices for acquiring images of peeled organic material; and
    an evaluation control system for analyzing image information of the acquired images and determining a peel value.

28. The peel evaluation system of claim 27, wherein the evaluation control system comprises a convolutional neural network.

29. The peel evaluation system of claim 28, wherein the convolutional neural network is defined based on training data sets including baseline information comprising classified image information of multispectral images of peeled organic material.

* * * * *